Dec. 27, 1960   H. L. McCOMBS   2,966,161
ACCELERATION LIMITING DEVICE
Filed Nov. 10, 1955
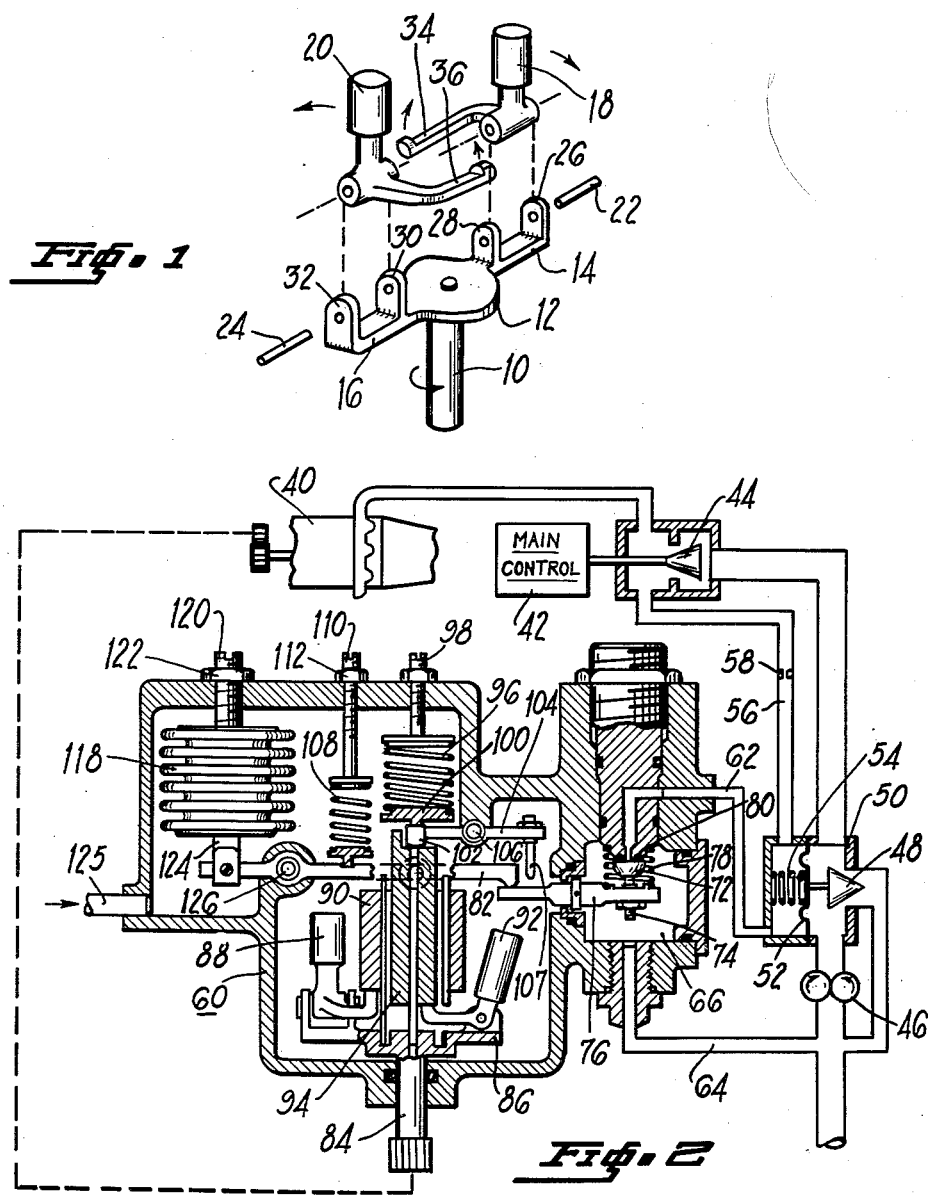
INVENTOR.
HOWARD L. McCOMBS
BY
Robert C. Smith
ATTORNEY United States Patent Office 2,966,161
Patented Dec. 27, 1960

2,966,161

ACCELERATION LIMITING DEVICE

Howard L. McCombs, South Bend, Ind., assignor to The Bendix Corporation, a corporation of Delaware Filed Nov. 10, 1955, Ser. No. 546,206

15 Claims. (Cl. 137—48)

This invention relates to acceleration sensing devices and more particularly to an acceleration sensing device for limiting the fuel supplied to a gas turbine engine in such manner as to avoid compressor stall.

It has been determined that if fuel is scheduled to an engine in such manner as to cause the engine to accelerate at a uniform rate, an acceleration can be selected which will enable said engine to approach compressor stall very closely without actually entering into a stall condition. This corresponds to a very nearly optimum acceleration for a given engine. In designing fuel control systems to accomplish this, however, a difficulty has been encountered in trying to produce a good mechanical device for limiting fuel flow with changes in acceleration. Problems resulting from excessive size and weight of equipment and from hysteresis introduced by inertia effects have been particularly troublesome.

An acceleration limiting device for aircraft must, of necessity, also provide for changes in the permissible rate of acceleration as changes occur in altitude or ambient air pressure, because an acceleration which might result in optimum acceleration at sea level would be very likely to result in compressor stall at high altitude.

To achieve the fastest possible acceleration of a given engine from operational idle speed to the maximum allowable rotational speed, it may be necessary to cause the acceleration limiting means to become inoperative when the engine reaches a speed where there is no longer any danger of running into compressor stall. It is, therefore, an object of the present invention to provide an acceleration limiting device in which the limiting effect of said device may be made ineffective for speeds in excess of any given speed.

It is another object of the present invention to provide a mechanical acceleration limiting device which is capable of varying its output with changes in entering air pressure or altitude conditions.

It is a further object of the present invention to provide a mechanical accelerometer which is simple and straightforward in construction, and relatively free from hysteresis and inertia effects.

It is a further object of the present invention to provide an acceleration limiting device in which all adjustments normally required are externally located and, therefore, very easily effected.

Other objects and advantages will become apparent from the following specification and the accompanying drawings, in which:

Figure 1 is a perspective drawing of my acceleration sensing device shown partially disassembled; and Figure 2 is a sectional drawing of an acceleration limiting device for a gas turbine engine incorporating my acceleration sensing means.

Referring now to Figure 1, a shaft 10 is driven in a rotational direction by a means not shown. Attached to the end of said shaft is a bracket 12 containing radially extending arms 14 and 16. Flyweights 18 and 20, respectively, are attached by means of pins 22 and 24 which are inserted through projecting lugs 26 and 28 on arm 14 and 30 and 32 on arm 16. This arrangement serves to prevent said flyweights from movement in any direction except tangent to their circle of rotation, which is a direction perpendicular to that usually employed by governor flyweights. The forces on the flyweights, then, resulting from rotational velocity of shaft 10 will simply be such as to cause the weights to be pressed against the outer brackets 26 and 32 thereby resulting in no significant movement whatever. In the case of an acceleration of shaft 10, however, these weights will be caused to move in a direction tangent to their normal direction of rotation as shown by the arrows. This will result in raising or lowering of the contacting surfaces of a pair of arms 34 and 36 which may be integrally attached to flyweights 18 and 20, respectively. It is, of course, apparent that the force exerted by arms 34 and 36 can be utilized to make whatever correction is desired.

Referring now to Figure 2, a gas turbine engine is shown generally at numeral 40. Fuel is supplied to said engine through the action of a main fuel control unit 42 which controls the position of a main metering valve 44. Fuel is supplied to valve 44 from a source, not shown, by means of a pump 46 which has its outlet pressure controlled through the action of a by-pass valve 48. Valve 48 is located in a chamber 50 which is divided into two sections by means of a diaphragm 52. The position of valve 48 is varied by varying the forces acting against said diaphragm. In normal operation the pump outlet pressure acts against the right side of said diaphragm and is balanced by metered fuel pressure plus the force exerted by a calibrated spring 54 to produce a constant fuel pressure to the metering valve 44. Metered fuel pressure is supplied to the left side of diaphragm 52 through a conduit 56 having a restriction 58 therein.

Under conditions in which it is desired to limit the acceleration of the engine 40, the forces acting on the left side of diaphragm 52 are modified through the action of an acceleration limiting unit shown generally at numeral 60. A conduit 62 provides communication between the left section of chamber 50 and the unit 60 and an additional conduit 64 provides communication between unit 60 and the upstream side of pump 46. Said conduits each communicate with a chamber 66. A valve 72 located in said chamber acts to control communication between conduits 62 and 64. This valve is supported on an adjustable stem 74 attached to a rocker arm 76. A spring 78, which urges the right side of rocker arm 76 downward, tends to move valve member 72 away from a seat 80. The upper end of seat 80 is threadedly engaged with the housing of unit 60, thereby providing a means of adjustment for the position at which valve member 72 is in contact with said seat.

Actuation of rocker arm 76 and, hence, valve 72 depends upon movement of a lever 82 which permits a downward force against the left end of said rocker arm and against the action of spring 78. The forces acting to control the position of lever 82 are developed as follows: a shaft 84 driven by the associated gas turbine engine 40 is used to drive a rotating table 86 containing two sets of flyweights of which only one weight of each set is shown for clarity. An acceleration sensing weight 88 is arranged as shown and described in Figure 1 above so that upon acceleration it exerts a force against a cylindrical follower member 90, which, in turn, exerts an upward force against lever 82. A speed sensing or governor weight 92 acts to produce an axially directed upward force against a cylindrical follower member 94, which force is opposed by means of a spring 96 adjustable by means of a screw 98. Positioned between cylindrical member 94 and a spring retaining means 100 is a block 102 the position of which is determined by the balance of forces generated by flyweight 92 and spring 96. Block 102 is attached to one end of a lever or arm 104 which is fulcrumed at a point 106 on housing 60. Attached to the other end of lever 102 is an adjustable contact point 107, the function of which is discussed below. Exerting a downward force on lever 82 is an acceleration trim spring 108 which is adjustable by means of a stem 110 threadedly engaged with housing 60 and a nut 112. It will be observed that cylindrical member 90 acts to force lever 82 in an upward direction upon an increase in the rate of acceleration beyond that permitted by the acceleration trim spring 108. Also positioned within housing 60 is an evacuated bellows 118 which is supported on one end by a stem 120 threadedly engaged with an adjusting nut 122 and with housing 60 and on the other end by a shaft 124 connected to lever 82. The exterior of bellows 118 communicates with atmospheric pressure by means of a conduit 125. Lever 82 is fulcrumed on housing 60 at point 126 in such manner that the force exerted by the bellows 118 will effectively change the bias of the acceleration trim spring with changes in atmospheric pressure. The forces on lever 82 are therefore: (a) the acceleration sensing force through which member 90 tends to move the right side of lever 82 in an upward direction, (b) a downward force through the action of trim spring 108 which acts as an acceleration reference, and (c) a force exerted by bellows 118 on the left side of fulcrum 126 which serves to effectively vary the acceleration reference with changes in altitude conditions. The force exerted by acceleration lever 82 tends to counterbalance the force exerted by valve spring 72 on rocker arm 76. Therefore, if lever 82 is caused to move away from rocker arm 76, spring 78 will force valve 72 open, thus providing communication between conduits 62 and 64, reducing the pressure drop across the main metering valve and thereby reducing the amount of acceleration fuel made available to the engine.

At some point along the acceleration schedule of the engine the governor structure described above comes into action to override the action of the acceleration limiting means. That point is established by adjustment of screw 98 thereby varying the pressure of spring 96 acting in opposition to flyweight 92 to establish the position of contact pin 107. When the rotational speed of the engine reaches this value, pin 107 will contact the left end of rocker arm 76 and hold valve 72 tightly against its seat irrespective of the action taken by the acceleration limiting lever 82. After this speed point is reached, the acceleration limiting device is no longer effective to limit the flow of fuel to the engine.

In operation the device described above will allow fuel flow to increase until an acceleration rate exceeding that established by the reference spring 108 is achieved, at which time lever 82 will be caused to move away from rocker arm 76 allowing valve 72 to open, thereby reducing the pressure drop across the main metering valve. This will result in decreased acceleration fuel flow and reduce the acceleration until it is within the limits established by the reference spring. Acceleration will proceed at this rate until the rotational speed of the turbine is such that the force exerted by governor weight 92 is effective to pivot contact pin 107 into its overriding position against rocker arm 76.

During an acceleration at high altitude, the action of the acceleration limiting device will be exactly as described except that bellows 118 will act to bias spring 108 in such manner as to reduce the force with which lever arm 82 presses down on the left end of rocker arm 76. Under these conditions, weight 88 and its corresponding cylindrical follower member 90 will be effective to move lever arm 82 away from rocker arm 76 at a lower acceleration value than would be the case at sea level. The action of the speed sensing structure which serves to override the acceleration limiting means is exactly the same as previously described.

It will be understood by those skilled in the art that various changes in size and arrangements of parts may be effected to suit particular requirements without departing from the spirit of the invention. For example, while the valve 72 shown herein has been discussed in relation to controlling the pressure drop across a main metering valve, it obviously could also control a servo pressure which in turn operates on a metering valve or other speed determining means. In some applications it might be desirable to control a pneumatic rather than a fuel or hydraulic servo pressure. Further, the speed sensing function provided by weights 92 could be supplied from other sources within the main control. It should, therefore, be understood that the present invention is not to be limited to the embodiments shown herein.

I claim:

1. A device for limiting the acceleration of a rotating member comprising a housing, a pair of conduits communicating with said housing, and means in said housing for controlling communication between said conduits comprising a valve, a rocker arm supporting said valve, a valve spring operably arranged to urge said rocker arm in such direction as to tend to open said valve, a lever contacting said rocker arm, an adjustable spring calibrated as a function of a desired acceleration value and exerting a force on said lever arm tending to oppose the force exerted by said valve spring, an evacuated bellows connected to said lever arm and communicating with the atmosphere operable to vary the effective calibration force on said lever arm with changes in atmospheric pressure, input means responsive to changes in speed of said rotating member, a flyweight device driven by said input means having weights rotatable in planes tangential to its circle of rotation upon the occurrence of a change in the rate of angular velocity of said means, a follower operatively positioned between said flyweight device and said lever for transmitting forces variable with acceleration of said input means to said lever, a governor flyweight device driven by said input means having weights actuable in a direction radial to its circle of rotation upon the occurrence of a change in velocity of said input means, a follower movable in response to movement of said governor flyweight device, a governor spring opposing the action of said governor device, means for varying the force exerted by said governor spring, a lever having one end positioned by the balance of forces between said governor spring and said governor weights, and a contact point located on the opposite end of said lever operable to contact said rocker arm upon the occurrence of a given rotational velocity of said input means thereby holding said valve in a closed position irrespective of the action of said lever.

2. A device for limiting the acceleration of a rotating member comprising a housing, a pair of conduits communicating with said housing, and means in said housing for controlling communication between said conduits comprising a rocker arm, a valve supported on one end of said rocker arm, resilient means acting against said rocker arm in such direction as to tend to urge said valve in an opening direction, a lever adapted to contact said rocker arm, an adjustable spring calibrated as a function of a desired acceleration value exerting a force on said lever in opposition to the force exerted by the resilient means, pressure sensitive means operably connected to said lever effective to vary said calibration with changes in atmospheric pressure, input means responsive to changes in speed of said rotating member, a flyweight device driven by said input means having weights rotatable in planes tangential to its circle of rotation upon the occurrence of an angular acceleration of said input means, follower means for transmitting the force exerted by said flyweight device to said lever, a governor, resilient means for calibrating said governor, an arm movable in response to changes in position of said governor, and a contact point on said arm operable to contact said rocker arm upon the occurrence of a given rotation velocity of said input means thereby holding said valve in a closed position irrespective of the action of said lever.

3. A device for limiting the acceleration of a rotating member comprising a housing, a pair of conduits communicating with said housing, and means in said housing for controlling communication between said conduits comprising a rocker arm, a valve supported on one end of said rocker arm, resilient means acting against said rocker arm in such direction as to tend to urge said valve in an open direction, a lever adapted to contact said rocker arm, an adjustable spring calibrated as a function of a desired acceleration value and exerting a force on said lever in opposition to the force exerted by said resilient means, pressure sensitive means operatively connected to said lever effective to vary said calibration with changes in atmospheric pressure, input means responsive to changes in speed of said rotating member, a flyweight device driven by said input means having weights rotatable in planes tangential to its circle of rotation upon the occurrence of an angular acceleration of said means, follower means for transmitting the force exerted by said flyweight device to said lever, a governor, and means movable in response to movement of said governor upon the occurrence of a given rotational velocity of said input means effective to hold said valve in a closed position irrespective of the action of said lever.

4. A device for limiting the acceleration of a rotating member comprising a housing, a pair of conduits communicating with said housing, and means in said housing for controlling communication between said conduits comprising a rocker arm, a valve supported on one end of said rocker arm, resilient means acting against said rocker arm in such direction as to tend to urge said valve in an opening direction, a lever adapted to contact said rocker arm, an adjustable spring calibrated as a function of a desired acceleration value and exerting a force on said lever in opposition to the force exerted by said resilient means, pressure sensitive means operably connected to said lever effective to vary said calibration with changes in atmospheric pressure, input means responsive to changes in speed of said rotating member, a flyweight device driven by said input means having weights rotatable in planes tangential to its circle of rotation upon the occurrence of an angular acceleration of said means, follower means for transmittting the force exerted by said flyweight device to said lever, and a governor actuable upon the occurrence of a given rotational velocity of said input means effective to hold said valve in a closed position irrespective of the action of said lever.

5. A device for limiting the acceleration of a rotating member comprising a housing, a pair of conduits communicating with said housing, and means in said housing for controlling communication between said conduits comprising a rocker arm, a valve supported on one end of said rocker arm, resilient means acting against said rocker arm in such direction as to tend to urge said valve in an opening direction, a lever adapted to contact said rocker arm, an adjustable spring calibrated as a function of a desired acceleration value and exerting a force on said lever in opposition to the force exerted by said resilient means, pressure sensitive means operably connected to said lever effective to vary said calibration with changes in atmospheric pressure, input means responsive to changes in speed of said rotating member, a flyweight device driven by said input means having weights rotatable in planes tangential to its circle of rotation upon the occurrence of an angular acceleration of said means, and follower means for transmitting the force exerted by said flyweight device to said lever.

6. A device for limiting the acceleration of a rotating member comprising a housing, a pair of conduits communicating with said housing, and means in said housing for controlling communication between said conduits comprising a valve, means supporting said valve, resilient means tending to open said valve, a lever adapted to contact said supporting means, means exerting a force representative of a predetermined acceleration value against said lever in such direction as to oppose the force exerted by said resilient means, pressure sensitive means for varying the effective value of said first named forces, input means responsive to changes in speed of said rotating member, an accelerometer operably connected to said input means, follower means for transmitting the force exerted by said accelerometer to said lever, a governor, and means movable in response to movement of said governor upon the occurrence of a given rotational velocity of said input means effective to hold said valve in a closed position irrespective of the action of said lever.

7. A device for limiting the acceleration of a rotating member comprising a housing, a pair of conduits communicating with said housing, and means in said housing for controlling communication between said conduits comprising a valve, means supporting said valve, resilient means tending to open said valve, a lever adapted to contact said supporting means, means exerting a force representative of a predetermined acceleration value against said lever in such direction as to oppose the force exerted by said resilient means, pressure sensitive means for varying the effective value of said first named force, input means responsive to changes in speed of said rotating member, an accelerometer operably connected to said input means, and follower means for transmitting the force exerted by said accelerometer to said lever.

8. A device for limiting the acceleration of a rotating member comprising a housing, a pair of conduits communicating with said housing, and means in said housing for controlling communication between said conduits comprising a valve, means supporting said valve, resilient means tending to open said valve, a lever adapted to contact said supporting means, means exerting a force representative of a predetermined acceleration value against said lever in such direction as to oppose the force exerted by said resilient means, pressure sensitive means for varying the effective value of said first named force, input means responsive to changes in speed of said rotating member, a flyweight device driven by said input means having weights rotatable in planes tangential to its circle of rotation upon the occurrence of an angular acceleration of said means, and follower means for transmitting the force exerted by said flyweight device to said lever.

9. A device for limiting the acceleration of a rotating member as set forth in claim 8 including speed-responsive means for preventing communication between said conduits when said device reaches a predetermined rotational speed.

10. A device for limiting the acceleration of a rotating member comprising a housing, a pair of conduits communicating with said housing, and means in said housing for controlling communication between said conduits comprising a rocker arm, a valve, means supporting said valve, resilient means tending to open said valve, a lever adapted to contact said supporting means, means exerting a force representative of a predetermined acceleration value against said lever in such direction as to oppose the force exerted by said resilient means, pressure sensitive means for varying the effective value of said first named force, input means responsive to changes in speed of said rotating member, a flyweight device driven by said input means having weights rotatable in planes tangential to its circle of rotation upon the occurrence of an angular acceleration of said means, follower means for transmitting the force exerted by said flyweight device to said lever, a governor, and means movable in response to movement of said governor upon the occurrence of a given rotational velocity of said input means effective to hold said valve in a closed position irrespective of the action of said lever.

11. A speed and acceleration sensing device comprising a rotatable shaft, a supporting member extending radially from said shaft, a pair of fly-weights attached to said supporting member in such manner that they are actuable in a radial direction with increases in velocity of said shaft, a cylindrical follower member movable in an axial direction in response to movement of said flyweights, a second pair of flyweights attached to said supporting member in such manner as to be rotatable in planes tangential to their circle of rotation upon the occurrence of an acceleration of said shaft, and a cylindrical follower concentrically positioned with respect to said first named follower movable axially in response to movement of said second pair of flyweights.

12. A speed and acceleration sensing device comprising a rotatable shaft, a supporting member extending radially from said shaft, a pair of flyweights attached to said supporting member in such manner that they are actuable in a radial direction with increases in velocity of said shaft, and a second pair of flyweights attached to said supporting member in such manner as to be rotatable in planes tangential to their circle of rotation upon the occurrence of an acceleration of said shaft.

13. An acceleration sensing device comprising a rotatable shaft, a supporting member extending radially from said shaft, a pair of flyweights attached to said supporting member in such manner that said flyweights are free to pivot with respect to said member only in planes tangential to their circle of rotation, and an arm attached to each of said flyweights for directing the force exerted by said flyweights in a direction essentially perpendicular to their direction of actuation.

14. An acceleration sensing device comprising a rotatable shaft, a bracket on said shaft having a radially extending arm, a flyweight member pivoted on said bracket in such manner that said flyweight is actuable during an acceleration of said shaft only in planes tangential to its circle of rotation, and an arm attached to said flyweight member for exerting a force in a direction essentially perpendicular to the direction of actuation of said flyweight.

15. An acceleration sensing device comprising a rotatable shaft, a bracket on said shaft having a radially extending arm, and a flyweight member pivoted on said arm in such manner that said flyweight is actuable during acceleration of said shaft only in planes tangential to its circle of rotation.

References Cited in the file of this patent

UNITED STATES PATENTS

| | | |
|---|---|---|
| 248,881 | Powers | Nov. 1, 1881 |
| 456,981 | Courtright | Aug. 4, 1891 |
| 2,376,844 | Ziebolz | May 22, 1945 |